(12) United States Patent
Kashiwakura et al.

(10) Patent No.: US 6,673,476 B2
(45) Date of Patent: Jan. 6, 2004

(54) MAGNETIC RECORDING MEDIUM AND MANUFACTURING PROCESS THEREOF

(75) Inventors: Yoshiharu Kashiwakura, Nagano (JP); Yoshihumi Ajishi, Nagano (JP); Tetsu Ikegami, Nagano (JP)

(73) Assignee: Fuji Electric Co., Ltd., Kawasaki (JP)

( * ) Notice: Subject to any disclaimer, the term of this patent is extended or adjusted under 35 U.S.C. 154(b) by 59 days.

(21) Appl. No.: 09/997,236

(22) Filed: Nov. 28, 2001

(65) Prior Publication Data

US 2002/0114979 A1 Aug. 22, 2002

(30) Foreign Application Priority Data

Nov. 29, 2000 (JP) .......................... 2000-363662

(51) Int. Cl.[7] .............................. G11B 5/66; G11B 5/70; B32B 15/00; B05D 5/12; C23C 14/34
(52) U.S. Cl. .................. 428/694 TS; 428/611; 428/664; 428/666; 428/900; 427/128; 427/131; 427/585; 204/192.2
(58) Field of Search .................. 428/694 TS, 611, 428/666, 900, 664; 427/128, 131, 585; 204/192.2

(56) References Cited

U.S. PATENT DOCUMENTS 6,287,429 B1 * 9/2001 Moroishi et al. ........ 204/192.2

FOREIGN PATENT DOCUMENTS

| JP | 6-215348 A | * | 8/1994 |
| JP | 7-021543 | | 1/1995 |

* cited by examiner

*Primary Examiner*—Holly Rickman
(74) *Attorney, Agent, or Firm*—Darby & Darby

(57) ABSTRACT

A magnetic recording medium has a non-magnetic ground layer, a non-magnetic recording layer, a protecting layer formed sequentially on a non-magnetic substrate, one on top of another. A double-layered non-magnetic ground layer consists of a pure chromium layer, positioned closer to a substrate, and a chromium-molybdenum-tungsten ternary alloy layer, positioned closer to a magnetic recording layer. This provides the non-magnetic recording layer formed on such a ground layer with cobalt alloy grains having uniform dimensions. The resulting magnetic recording medium has an excellent SNR.

5 Claims, 3 Drawing Sheets

MAGNETIC RECORDING MEDIUM AND MANUFACTURING PROCESS THEREOF

BACKGROUND OF THE INVENTION

1 Field of the Invention

The present invention relates to a magnetic recording medium useful in, for example, the memory of an information-related instrument. The present invention further relates for a manufacturing process thereof.

2. Prior Art

With the emergence of a highly information-oriented society, a greater demand has risen recently for the memory of information-related instruments, including computers, to attain a higher recording density. There has been some improvements in both the performance of a recording head to read in and out a magnetic recording medium, as well as in the recording density of a medium in a magnetic recording device.

Dense recording in the medium assumes an increase in a ratio of reproduction signals to medium noises when recorded signals are reproduced.

In general, a conventional magnetic recording medium includes a non-magnetic substrate, a non-magnetic ground layer, a magnetic recording layer, and a protecting layer. The magnetic recording layer records information. The protecting layer protects the magnetic recording layer from abrasion caused from sliding with a magnetic head. A non-magnetic ground layer, a magnetic recording layer, and a protecting layer are formed consecutively on the non-magnetic substrate, one on top of another. The non-magnetic substrate is preferably made from an aluminum alloy or glass. The non-magnetic ground layer controls the crystal orientations of the magnetic recording layer that is deposited thereon.

Referring to FIG. 1, a typical chart shows the layer constitution of a conventional magnetic recording medium. A ground layer 2 is usually formed on a non-magnetic substrate 1, such as glass and aluminum alloy plated with Ni—P. The material used for ground layer 2 includes a chromium and a chromium alloy thin film. Further, a magnetic recording layer 3 formed on ground layer 2 employs a magnetic thin film composed of a cobalt and chromium alloy doped with several kinds of elements. A thin film, mainly composed of carbon, is used for an uppermost protecting layer 4.

The layered structure of the medium is conventionally formed with a sputtering technique. This is the method of choice since the sputtering technique facilitates the control of layer characteristics and enables the manufacture of a high-quality thin film.

Magnetic recording layer 3, formed with the sputtering technique on ground layer 2, is a polycrystal consisting of minute grains of cobalt alloy. In the same way as magnetic recording layer 3, ground layer 2 is a polycrystal consisting of minute grains of chromium metal or chromium alloy. Magnetic recording layer 3 grows epitaxially on ground layer 2, with crystallographic orientation of magnetic recording layer 3 coordinated with that of ground layer 2. Magnetic recording layer 3, on the one hand, is usually made of a cobalt and chromium alloy doped with an element, such as platinum and tantalum, that has larger metal bond radius than cobalt. Hence, it is usual that the cobalt alloy has higher lattice constant than pure cobalt metal. On the other hand, ground layer 2 was once made of pure chromium metal for its excellent crystallinity and low cost. However, pure chromium metal has smaller lattice constant than cobalt alloy used in a magnetic recording layer, adversely affecting the epitaxial growth thereof. Then, it is a common practice of late to use chromium alloy doped with an element, including molybdenum, tungsten, vanadium, and titanium, that has a larger metal bond radius than chromium to give ground layer 2.

This practice enlarges the lattice constant of the ground layer crystal and facilitates the epitaxial growth of a magnetic recording layer on a ground layer. Further, Japanese Laid-Open Patent Publication No. 7-21543 discloses a magnetic recording medium wherein the ground layer thereof has a layered structure of a chromium metal and a binary chromium alloy layer. This enables the potentiality for epitaxial growth to consist with required grain growth.

As mentioned previously, a magnetic recording layer is made of a polycrystal consisting of minute crystal grains of a cobalt alloy. In order to form a minute recording bit in the magnetic recording layer, it is desired that the crystal grain dimensions of the cobalt alloy in the magnetic recording layer be more minute and uniform. Achieving this requires control of the thin ground layer located under the magnetic recording layer in terms of a crystallographic property.

A pure chromium ground layer in a magnetic recording medium facilitates the formation of minute crystal grains in the magnetic recording layer. However, differences in the lattice spacing of pure chromium and cobalt alloy crystal set forth earlier provides no increased SNR. A magnetic recording medium with a chromium alloy ground layer, and magnetic recording medium with the layered ground layer consisting of a chromium metal and binary chromium alloy layers disclosed in Japanese Laid-Open Patent Publication No. 7-21543 has the following problems. That is, conventional magnetic recording mediums have been successful in reducing the crystal grain dimensions of a magnetic recording layer to some extent. However, there has been difficulty in sizing the crystal grains in a sufficiently uniform manner, leaving little room for an improvement in SNR.

OBJECTS AND SUMMARY OF THE INVENTION

It is an object of the present invention to provide a magnetic recording medium which overcomes the foregoing problems of the conventional designs.

It is a further object of the present invention to provide a magnetic recording medium with higher recording density.

It is another object of the present invention to provide a magnetic recording medium with an increased SNR.

It is still another object of the present invention to provide a method for making such a magnetic recording medium.

Briefly stated, the present invention provides a magnetic recording medium having a non-magnetic ground layer, a non-magnetic recording layer, a protecting layer formed sequentially on a non-magnetic substrate, one on top of another. A double-layered non-magnetic ground layer consists of a pure chromium layer, positioned closer to a substrate, and a chromium-molybdenum-tungsten ternary alloy layer, positioned closer to a magnetic recording layer. This provides the non-magnetic recording layer formed on such a ground layer with cobalt alloy grains having uniform dimensions. The resulting magnetic recording medium has an excellent SNR.

According to an embodiment of the present invention, there is provided a multi-layered magnetic recording medium having at least three thin films comprising a non-magnetic substrate, a non-magnetic ground layer, a magnetic recording layer, and a protecting layer. The non-magnetic ground layer, magnetic recording layer and protecting layer are formed sequentially on the non-magnetic substrate, one on top of another. The non-magnetic ground layer is double-layered, including a first non-magnetic metal layer and a second non-magnetic metal layer, the first non-magnetic metal layer having a composition different from the second non-magnetic metal layer. The first non-magnetic metal layer, being a pure chromium layer, is positioned closer to the non-magnetic substrate, and the second non-magnetic metal layer, being a chromium-molybdenum-tungsten ternary alloy layer, is positioned closer to the magnetic recording layer.

According to another embodiment of the present invention, there is provided a manufacturing process for a magnetic recording medium including the steps of (a) forming at least a pure chromium ground layer, a chromium-molybdenum-tungsten ternary chromium alloy ground layer, and a magnetic recording layer consecutively on a non-magnetic substrate, one on top of another with a sputtering technique; and (b) forming a protecting layer with one of a sputtering technique and a CVD technique.

A new layer composition for a magnetic recording medium according to the present invention provides cobalt alloy crystal grains in a magnetic recording layer with more uniform diameters with other characteristics intact. This improves the SNR of the magnetic recording medium.

The inventors have devoted themselves to the study to solve the problems set forth earlier. A non-magnetic ground layer was double-layered. The layer closer to a substrate was made of pure chromium metal. Further, the other of the two layers, positioned closer to a magnetic recording layer, was made of chromium-molybdenum-tungsten ternary alloy. This experiment has shown the possibility that the cobalt alloy magnetic recording layer with more uniform crystal grain dimensions is formed on the ground layer.

The present invention was performed in accordance with these findings. The following describes the characteristics of a magnetic recording medium of the present invention. The magnetic recording medium of the present invention comprises a non-magnetic substrate, a non-magnetic ground layer, a magnetic recording layer, and a protecting layer. The non-magnetic ground layer and the magnetic recording layer are formed consecutively on the non-magnetic substrate, one on top of another. The non-magnetic ground layer and the magnetic recording layer are formed with either a sputtering technique of a CVD technique. The protecting layer is consecutively formed on those layers with a sputtering technique. Thus, the magnetic recording medium of the present invention has the layered structure of at least three thin films. The non-magnetic ground layer has a layered structure consisting of two non-magnetic metal layers of different compositions. In addition, the non-magnetic metal layer closer to the substrate is made of pure chromium. The non-magnetic metal layer closer to the magnetic recording layer is made of chromium-molybdenum-tungsten ternary alloy.

The manufacturing process of the present invention comprises the steps of forming at least a pure chromium ground layer, a ternary chromium alloy ground layer consisting of chromium, molybdenum, and tungsten, a magnetic recording layer, and a protecting layer consecutively on a non-magnetic substrate, one on top of another. The pure chromium ground layer, the ternary chromium alloy ground layer, and the magnetic recording layer are formed with a sputtering technique. Protecting layer is formed with either a sputtering technique or a CVD technique. Thus, a magnetic recording medium with a high SNR is manufactured.

The above, and other objects, features and advantages of the present invention will become apparent from the following description read in conjunction with the accompanying drawings, in which like reference numerals designate the same elements.

DETAILED DESCRIPTION OF THE INVENTION

Figure 1:
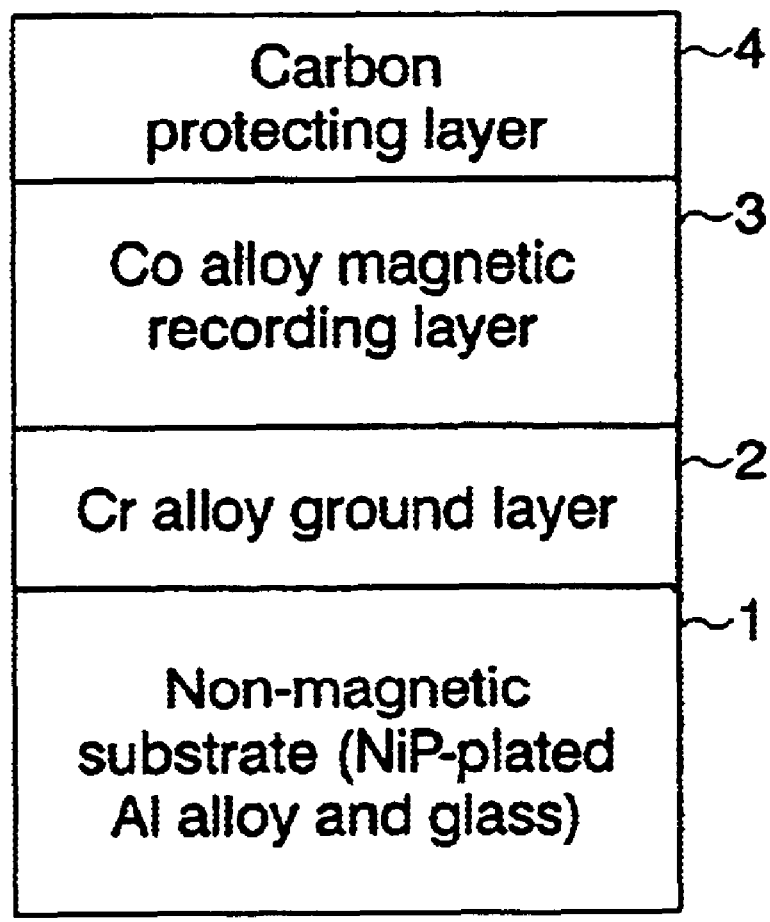
FIG. 1 is a cross-sectional view of a conventional multi-layered magnetic recording medium.

A magnetic recording medium according to the present invention has a double-layered non-magnetic ground layer. One of the two layers, positioned closer to the substrate, is made of pure chromium. The other of the two layers, positioned closer to the magnetic recording layer, is made of ternary alloy consisting of chromium, molybdenum, and tungsten. Thus, the magnetic recording medium of the present invention is characterized by its magnetic recording layer formed on the ground layer with the dimensions of cobalt alloy grains grown more uniformly.

Desirably, the pure chromium layer, the closer one of the two layers to the substrate in the double-layered non-magnetic ground layer, has layer thickness not less than 20% and not more than 80% of the total thickness of the non-magnetic ground layer. Further desired, is a total layer thickness of the non-magnetic ground layer not more than 20 nm.

Further desired is the ternary alloy layer, consisting of chromium, molybdenum, and tungsten, the closer one of the two layers to the magnetic recording layer, satisfies the following composition:

(a) 5 to 30 at % molybdenum and tungsten;
(b) 4 to 29 at % molybdenum;
(c) 1 to 15 at % tungsten; and
(d) the balance chromium.

Grain dimensions of 12 nm or less is suitable to achieve recording densities 10 Gbit/in$^2$ or more. The preferred total layer thickness of 20 nm or less in the ground layer satisfies the grain dimensions.

The coordination of the lattice constant of the ground layer crystal with that of the recording layer crystal places a lower limit on the range of chromium-molybdenum-tungsten alloy. Deterioration in the crystallinity of a chromium matrix places an upper limit on the range of cobalt-molybdenum-tungsten alloy. Experiment sets the appropriate total contents of molybdenum and tungsten from five to 30 at %. Each content of molybdenum and tungsten is determined appropriately so that the lattice constant of the chromium alloy crystal in the ground layer matches that of cobalt alloy crystal in the magnetic recording layer. Tungsten content, however, is specified within 15 at %, since tungsten contents exceeding 15 at % cause the grains to enlarge. It is desired that the composition formulae set forth earlier be satisfied in terms of requirement for the coexistence of chromium, molybdenum, and tungsten.

The magnetic recording medium of the present invention is characterized by realizing minute and uniformly sized grains in the ground layer, thereby causing minute and uniformly sized grains to grow on those in the ground layer. Growing minute and uniformly sized crystal grains in the ground layer is affected neither by the kind nor the layer-forming condition of the layer formed thereon. Hence, realizing minute and uniformly sized grains in the ground layer of the present invention causes those in the magnetic recording layer to grow effectively, provided that an epitaxial growth of the magnetic recording layer is allowed to proceed on the ground layer. Neither the chemical composition nor the constitution of the magnetic recording layer is accordingly specified in the magnetic recording medium of the present invention.

Besides, an intermediate layer is sometimes formed between the non-magnetic ground layer and the magnetic recording layer to improve, for example, the quality of magnetic recording density. The intermediate layer is made of a non-magnetic or a magnetic cobalt alloy. Minute and uniformly sized grains in the ground layer of the present invention help grow those in the magnetic recording layer, provided that the intermediate layer and the magnetic recording layer is allowed to grow epitaxially on the ground layer and the intermediate layer respectively.

EXAMPLE

The following describes the example of the present invention.

Figure 2:
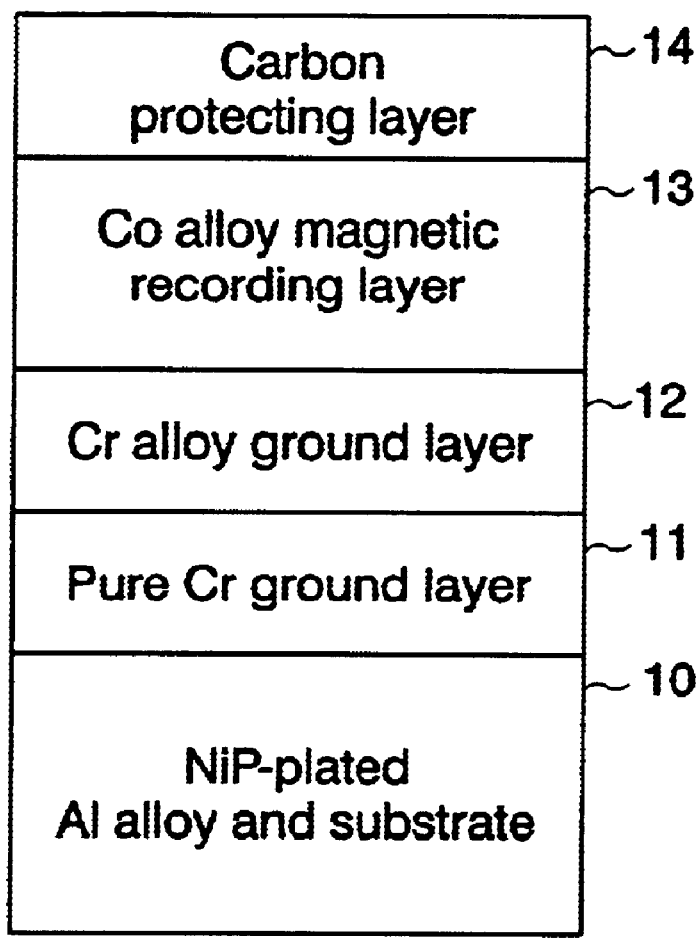
FIG. 2 is a cross-sectional view of a magnetic recording medium according to the present invention, as referred to in an example below.

Referring to FIG. 2, a sectional view is shown of a magnetic recording medium according to this present example.

A magnetic recording medium of the example comprises an aluminum alloy substrate 10, a pure chromium ground layer 11, a chromium alloy ground layer 12, a cobalt alloy magnetic recording layer 13, and a carbon protecting layer 14. Pure chromium ground layer 11, chromium alloy ground layer 12, cobalt alloy magnetic recording layer 13, and carbon protecting layer 14 are formed consecutively on aluminum alloy substrate 10, one on top another with a DC magnetron sputtering technique. Aluminum alloy substrate 10 is textured circumferentially and plated with Ni—P. Magnetic layer 13 was made of a cobalt alloy having the composition of cobalt-24chromium-10platinum-2boron (at %). It is confirmed that the layers formed have almost equal composition with the target used in the DC magnetron sputtering.

Substrate 10 has a doughnut-shaped outward appearance, with an external circumference of 95 mm, an internal circumference of 25 mm, and a thickness of 1.0 mm. Carbon protecting layer 14 has a layer thickness of 8 nm.

An even argon pressure of 5 mTorr was maintained during sputtering. Substrate 10 was heated at about 250° C. just before the formation of the ground layer 11.

Table 1 shows the result of the measurements concerning grain dimensions and grain dimensions variance in the cobalt magnetic recording layer. Five kinds of magnetic recording media referring to Example 1 and Comparative Examples 1, 2, 3, and 4 were measured. Four kinds of magnetic recording media referring to Comparative Examples 1, 2, 3, 4 each have different ground layer constitutions. An even total thickness of 18 nm was maintained in the ground layer. Grain dimensions and the grain dimensions variance was calculated according to micrograph data measured with a TEM.

Ground layer referring to the Comparative Example 1 is made of pure chromium. The cobalt alloy referring to Comparative Example 1 has the minimum grain dimensions and grain dimensions variance among five magnetic recording media. The conventional ground layer referring to Comparative Example 2 is single-layered and made of chromium-molybdenum alloy. The conventional ground layer referring to Comparative Example 3 is double-layered and consists of a pure chromium layer and a chromium-molybdenum alloy layer. The cobalt alloy referring to Comparative Example 2 and Comparative Example 3 has almost equal grain dimensions. The cobalt alloy referring to Comparative Example 2 and Comparative Example 3 has almost equal grain dimensions variance. The ground layer referring to Comparative Example 4 is single-layered and made of chromium-molybdenum-tungsten alloy. The cobalt alloy referring to Comparative Example 4 is almost equal to that referring to Comparative Example 2 and Comparative Example 3 in terms of grain dimensions variance. The cobalt alloy referring to Comparative Example 4 is larger than that referring to Comparative Example 2 and Comparative Example 3 in terms of grain dimensions, predicting difficulty in forming more minute recording bits in the magnetic recording layer.

In contrast, the ground layer referring to Example 1 is double-layered and consists of a pure chromium layer and a chromium-molybdenum-tungsten alloy layer. The cobalt alloy referring to Example 1 is almost equal to that referring to Comparative Example 2 and Comparative Example 3 in terms of grain dimensions. The cobalt alloy referring to Example 1 is about 15% smaller than that referring to Comparative Example 2 and Comparative Example 3 in terms of grain dimensions variance, Hence, it is anticipated that the double-layered ground layer referring to Example 1 gives excellent SNR.

TABLE 1

| | ground layer constitution | Co grain dimensions d (nm) | variance of Co grain dimensions σ (nm) | σ/d |
|---|---|---|---|---|
| Comp. Ex. 1 | single-layered pure chromium (18 nm) | 8.0 | 2.17 | 0.271 |
| Comp. Ex. 2 | single-layered Cr-2Mo (18 nm) | 11.0 | 3.41 | 0.310 |
| Comp. Ex. 3 | multi-layered Cr 20 Mo (9 nm)/ pure Cr (9 nm) | 11.4 | 3.37 | 0.296 |
| Comp. Ex. 4 | single-layered Cr-15Mo-5W (18 nm) | 12.1 | 3.42 | 0.283 |
| Example 1 | Multi-layered Cr-15Mo-5W (9 nm)/ pure Cr (9nm) | 11.1 | 2.91 | 0.263 |

Cobalt Crystal Grain Dimensions and Variance Calculated According to Micrograph Data of TEM versus Ground Layer Constitution of Magnetic Recording Media.

Basic Layer Constitution: Carbon Coating Layer/Co-24Cr-10Pt-2B Magnetic Recording Layer/Ground layer/Aluminum Substrate.

Figure 3:
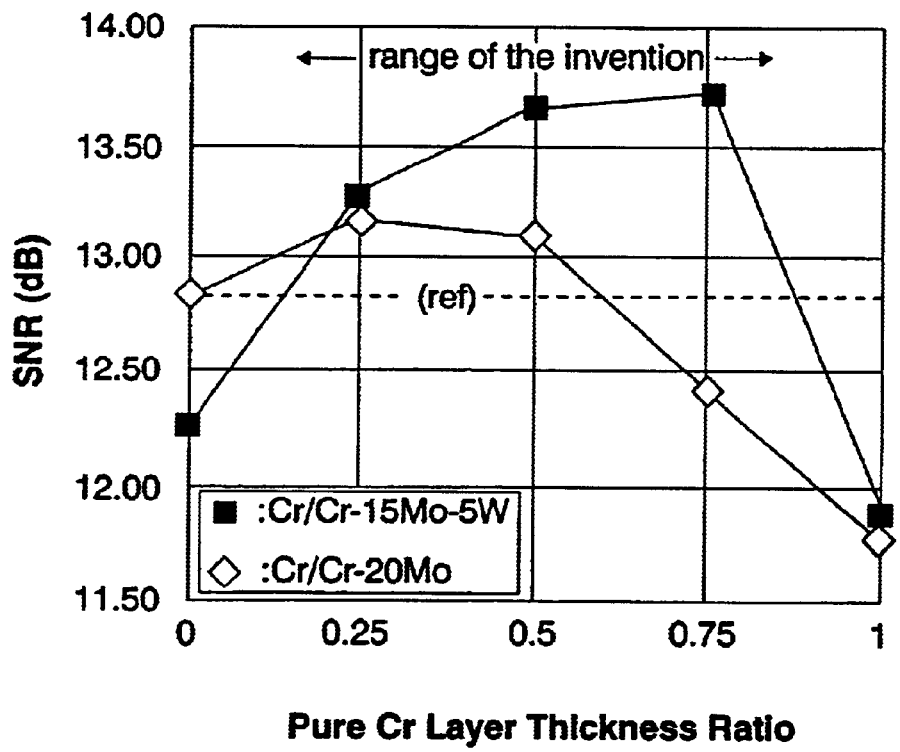
FIG. 3 is a diagram plotting the SNR of a magnetic recording medium of the present invention, as referred to in an example below, against pure chromium layer thickness ratio in a ground layer consisting of a pure chromium and chromium alloy layers.

Referring to FIG. 3, a diagram plots the SNR against pure chromium layer thickness ratio in a ground layer. The ground layer referred to herein has a double-layered structure consisting of a pure chromium layer and a chromium alloy layer.

An even total layer thickness of 18 nm was maintained in the ground layer. Spinning stand type tester was used for measuring SNR. SNR was measured at a linear density of 308 kfci with a GMR head. Varying electric powers at respective layer formation controlled thickness ratio of pure chromium layers to chromium alloy layers. Hence, layer formation has all the conditions in common except electric powers required to form a pure chromium layer and a chromium alloy layer. Layer thickness of a magnetic layer is adjusted so that the magnetic recording medium manufactured has a residual magnetization multiplied by magnetic layer thickness (Mrt) of 0.45 memu/cm$^2$. Layer thickness of a magnetic layer is in the range of 17 nm and 20 nm. Varying the product of residual magnetization by magnetic layer thickness (Mrt) affects a R/W characteristic, thereby making it difficult to evaluate the result brought by the example. An even product of residual magnetization by magnetic layer thickness (Mrt) was maintained to avoid the difficulty.

One magnetic recording medium measured has the ground layer of a multi-layered structure consisting of a pure chromium and a chromium-15molybdenum-5tungsten alloy layer. The other magnetic recording medium measured has the ground layer of a multi-layered structure consisting of a pure chromium and chromium-20molybdenum alloy layers. Findings reveal that forming the respective ground layers of a multi-layered structure provides an increase in SNR over single-layered ground layers represented in the diagram by points on a left and right ends. A magnetic recording medium with the ground layer consisting of a pure chromium and a chromium-molybdenum-tungsten alloy layer yields larger SNR than the one consisting of a pure chromium and a chromium-molybdenum alloy layer. This indicates that the former ground layer consisting of a pure chromium and a chromium-molybdenum-tungsten alloy layer provides an improvement in SNR over the latter one, the chromium-molybdenum-tungsten alloy layer improving SNR more effectively when it forms a multi-layered ground layer. Conventional magnetic recording medium with a single-layered ground layer consisting of chromium-20molybdenum is described by the mark ◊ on a left end in the diagram. The magnetic recording medium is set for a reference and hereinafter referred to as ref. The pure chromium layer thickness ratio is used, exhibiting higher SNR than the ref. The magnetic recording medium with the ground layer consisting of a pure chromium and chromium-molybdenum-tungsten alloy layers has a wider range in the pure chromium layer thickness ratio stated earlier than that consisting of a pure chromium and chromium-molybdenum alloy layers. This demonstrates that the ground layer, consisting of a pure chromium and chromium-molybdenum-tungsten alloy layers, is superior to that consisting of a pure chromium and a chromium-molybdenum alloy layers. This is ascribed to the effect that a multi-layered ground layer consisting of a pure chromium and chromium-molybdenum-tungsten alloy layers has on the uniform formation of grain dimensions. The thickness ratio of pure chromium layers to chromium-molybdenum-tungsten alloy layers is maintained within the range that exhibits higher SNR than that of the ref A pure chromium layer thickness ratio is maintained over the range 20% to 80% in the magnetic recording medium of the present invention. The magnetic recording medium with a single-layered pure chromium ground layer has minimum grain dimensions and grain dimensions variance as shown in Table 1. The magnetic recording medium exhibits the poorest SNR among the sample media as shown by the point on the right end in the diagram. As mentioned earlier, the epitaxial growth of cobalt alloy on a pure chromium crystal is poor, since the lattice spacing of a pure chromium crystal is smaller than that of a cobalt alloy crystal. This deteriorates the grain characteristics of a cobalt alloy magnetic layer.

Table 2 shows the variation of SNR and pulse width at half maximum (Pw 50) when the ground layer thickness is reduced. The Pw50 refers to half-width of the solitary playback output waveform in R/W measurement. The Pw50 gives a criterion to determine magnetization reversal transition width. The smaller the Pw50, the higher the recording density. The narrower the magnetization reversal transition width is, the less the playback output signal interferes with each other on increasing the recording density of the medium. Narrow magnetization reversal transition width enables the medium to have high recording density. Moreover, a thickness ratio of 25 to 75, in terms of pure chromium layers to chromium alloy layers, was maintained in magnetic recording media with a multi-layered ground layer referring to Comparative Examples 7 and 8 and Examples 2 and 3.

The magnetic recording media referring to Comparative Examples 5 and 6 have a single-layered chromium-molybdenum ground layer. Reducing the ground layer thickness of these media from 18 nm to 13.5 nm tends to improve both SNR and Pw50 to little purpose. The magnetic recording media referring to Comparative Examples 7 and 8 have a multi-layered ground layer consisting of a pure chromium and chromium-20molybdenum alloy layers. Reduced ground layer thickness in these media adversely affects SNR. It is a common knowledge that reducing ground layer thickness, on one hand, provides reduced grain dimensions in the ground layer, improving SNR and Pw50. On the other hand, reducing a chromium and chromium alloy layers thickness worsens crystallinity in these layers, deteriorating SNR and Pw50. That is, equilibrium between the formation of minute grains and deterioration in crystallinity varies SNR and Pw50 on reducing ground layer thickness. Deducibly, magnetic recording medium with the single-layered chromium-molybdenum ground layer finds the equilibrium in favor of deterioration in crystallinity over the formation of minute grains, providing no sufficient improvement in SNR and Pw50 on reducing ground layer thickness. The same deduction holds true for the magnetic recording medium with a multi-layered ground layer consisting of a pure chromium and chromium-molybdenum alloy layers.

The magnetic recording media, referring to Comparative Examples 9 and 10, have a single-layered chromium-molybdenum-tungsten alloy ground layer. The magnetic recording media referring to Examples 2 and 3 have a ground layer of a multi-layered structure consisting of a pure chromium and a chromium-molybdenum-tungsten alloy layer. Reducing ground layer thickness of these media from 18 nm to 13.5 nm, however, improves effectively SNR by 0.7 to 0.9 dB and Pw50 by 0.2 nsec over the media referring to Comparative Examples 5, 6, 7 and 8. It is deduced that the magnetic recording medium with the chromium-molybdenum-tungsten layer in the ground layer finds the equilibrium in favor of the formation of minute grains far over deterioration in crystallinity on reducing the layer thickness. Hence, use of chromium-molybdenum-tungsten alloy in a ground layer enables the ground layer to have smaller thickness without great deterioration in crystallinity. Thus, it is possible to manufacture a magnetic recording medium with minute grains, and excellent SNR and Pw50. In addition, comparison of the media referring to Comparative Example 10 and Example 3 indicates that a multi-layered ground layer consisting of a pure chromium and chromium-molybdenum-tungsten alloy layers effectively improves SNR, even when the ground layer has reduced thickness.

TABLE 2

Variation of SNR and Pw50 on Reducing Ground Layer Thickness

| | ground layer constitution | Total ground layer thickness | SNR (dB) | Pw50 (nsec) |
|---|---|---|---|---|
| Comp. Ex. 5 | single-layered Cr-20Mo | 18 nm | 12.82 | 7.90 |
| Comp. Ex. 6 | | 13.5 nm | 13.24 | 7.80 |
| Comp. Ex. 7 | Multi-layered Cr-20Mo/pure Cr layer thickness ratio 75/20 | 18 nm | 13.16 | 7.87 |
| Comp. Ex. 8 | | 13.5 nm | 13.03 | 7.87 |
| Comp. Ex. 9 | single-layered Cr-15Mo-5W | 18 nm | 12.28 | 7.85 |
| Comp. Ex. 10 | | 13.5 nm | 13.16 | 7.65 |
| Example 2 | multi-layered Cr-15Mo-5W/pure Cr layer thickness ratio 75/25 | 18 nm | 13.26 | 7.87 |
| Example 3 | | 13.5 nm | 13.98 | 7.70 |

Basic Layer Constitution: Carbon Protecting Layer/Co-24Cr-10Pt-2B Magnetic layer/Ground Layer/Aluminum Substrate As set forth earlier, a magnetic recording medium of the present invention has a multi-layered ground layer consisting of a pure chromium and chromium-molybdenum-tungsten alloy layers. Multi-layered ground layer consisting of a pure chromium and chromium-molybdenum-tungsten alloy layers forms cobalt grains with uniform dimensions, thereby improving in SNR. Further, the multi-layered ground layer consisting of a pure chromium and chromium-molybdenum-tungsten alloy layers enables the ground layer to have reduced thickness with no loss in crystallinity. Reduced ground layer thickness facilitates the formation of minute grains in the ground layer, thereby enabling an improvement in SNR.

Effect of the Invention

As mentioned above, the magnetic recording medium of the present invention has a double-layered non-magnetic ground layer. The non-magnetic ground layer consists of a pure chromium layer, positioned closer to a substrate, and a chromium-molybdenum-tungsten ternary alloy layer, positioned closer to a magnetic recording layer. Specifying the thickness ratio of the two layers and the composition of chromium-molybdenum-tungsten alloy within an appropriate range forms cobalt alloy grains with uniform dimensions in the recording layer formed on the ground layer, thereby improving the SNR of a magnetic recording medium.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A multi-layered magnetic recording medium having at least three thin films comprising:

a non-magnetic substrate;

a non-magnetic ground layer; said non-magnetic ground layer having a total thickness of 20 nm or less;

a magnetic recording layer;

a protecting layer;

said non-magnetic ground layer, magnetic recording layer and protecting layer being formed sequentially on said non-magnetic substrate, one on top of another;

said non-magnetic ground layer being double-layered, including a first non-magnetic metal layer and a second non-magnetic metal layer, said first non-magnetic metal layer having a composition different from said second non-magnetic metal layer; and said first non-magnetic metal layer, being a pure chromium layer, is positioned closer to said non-magnetic substrate; and said first non-magnetic metal layer having a thickness from 20% to 80% of a total thickness of said non-magnetic ground layer; and said second non-magnetic metal layer, being a chromium-molybdenum-tungsten ternary alloy layer, is positioned closer to said magnetic recording layer.

2. The multi-layered magnetic recording medium according to claim 1 wherein:

said non-magnetic ground layer and said magnetic recording layer are formed with a sputtering technique; and said protecting layer is formed with one of a sputtering technique or a CVD technique.

3. The magnetic recording medium according to claim 1, wherein said second non-magnetic metal layer satisfies the following composition:

(a) 5 to 30 at % molybdenum and tungsten;

(b) 4 to 29 at % molybdenum;

(c) 1 to 15 at % tungsten; and (d) the balance chromium.

4. A manufacturing process for a magnetic recording medium comprising the steps of:

(a) forming at least a pure chromium ground layer, a chromium-molybdenum-tungsten ternary chromium alloy ground layer, and a magnetic recording layer sequentially on a non-magnetic substrate, one on top of another with a sputtering technique, wherein said pure chromium ground layer has a thickness from 20% to 80% of a total thickness of said pure chromium ground layer and said chromium-molybdenum-tungsten ternary chromium alloy ground layer, and wherein said total thickness is 20 nm or less; and (b) forming a protecting layer with one of a sputtering technique and a CVD technique.

5. The manufacturing process of a magnetic recording medium according to claim 4, wherein:

said chromium-molybdenum-tungsten ternary chromium alloy ground layer satisfies the following composition:

(a) 5 to 30 at % molybdenum and tungsten;

(b) 4 to 29 at % of molybdenum;

(c) 1 to 15 at % of tungsten; and (d) the balance chromium.

* * * * *